June 11, 1929.                E. J. DE NORMANVILLE                1,717,097
VARIABLE VELOCITY RATIO GEARING OF THE SUN AND PLANET WHEEL TYPE
Filed March 9, 1927          3 Sheets-Sheet 1

INVENTOR
Edgar Joseph de Normanville
BY
ATTORNEY

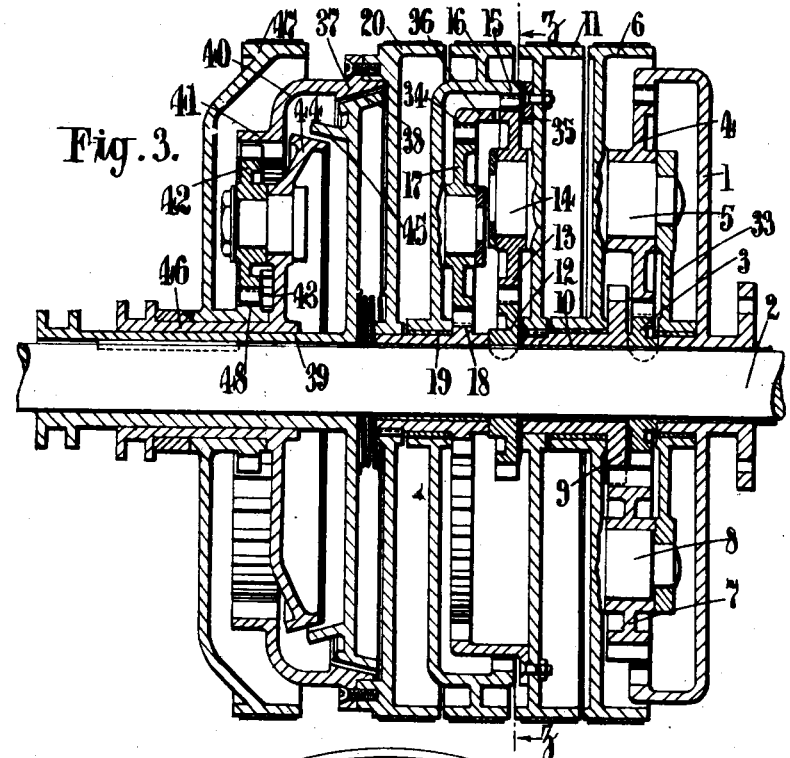

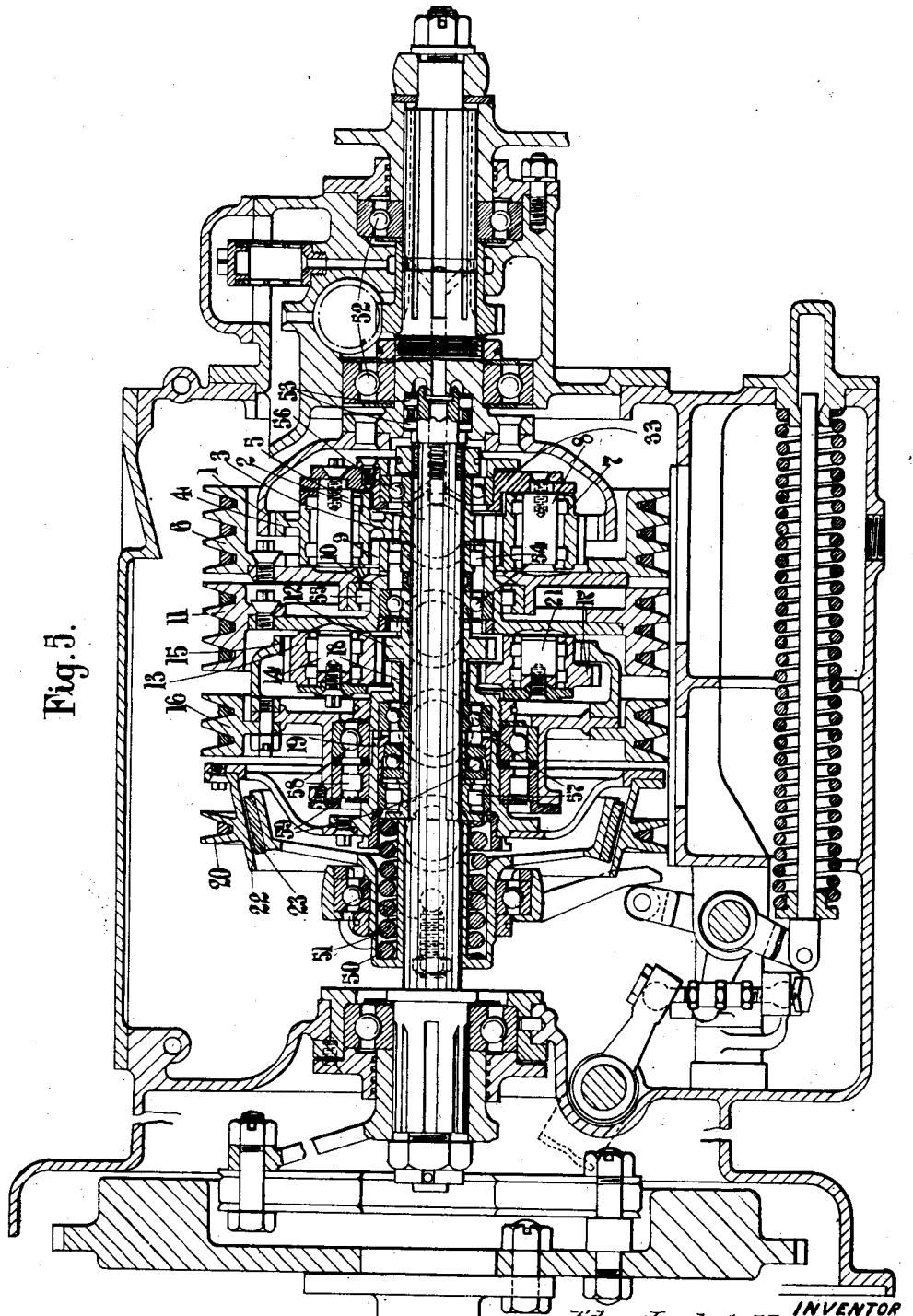

Patented June 11, 1929.

1,717,097

UNITED STATES PATENT OFFICE.

EDGAR JOSEPH de NORMANVILLE, OF LONDON, ENGLAND.

VARIABLE-VELOCITY RATIO GEARING OF THE SUN AND PLANET WHEEL TYPE.

Application filed March 9, 1927, Serial No. 174,000, and in Great Britain April 21, 1926.

This invention relates to variable velocity ratio gearing of the sun and planet wheel type in which additional groups of gear wheels are successively brought into the driving train, the groups of gear wheels being arranged side by side along the driving shaft.

According to this invention the gearing comprises one or more groups in which two planet wheels carried on a brake drum are in gear one with the other, one of the planet wheels gearing with a driving wheel and with an internally toothed gear wheel or annulus whilst the other planet wheel is in gear with a sun wheel fast with a brake drum different from that which carries the planet wheels.

The first group is arranged to provide for rotation of the driven member at a slower speed than that of the driving shaft in the reverse direction, another group is arranged to provide for rotation of the driven member at a slower speed than that of the driving shaft in the same or forward direction and the forward speed of the driven member is increased by increasing the speed of the sun wheel of this group by transmitting to it rotational movement at different speeds by means of additional sun and planet wheel groups successively added to the operative or driving train.

The improved gearing may be arranged to provide for driving the driven member in the same direction or in the opposite direction to that in which the driving shaft or driving gear wheel rotates and the said gear may also be arranged to give speeds of the driven member greater than that of the driving member as well as an equal and slower speed.

The arrangements of gearing contemplated by this invention avoid the employment of an inconvenient number of concentric sleeves and an inconvenient number of planet wheel carriers and internally toothed wheels or annuli. The constructions proposed also allow of the employment of spur or plain gear wheels of practicable sizes, and allow the bearing speeds and angular velocity of the gear wheels to be kept low, so that a quiet and efficient gearing is provided owing to the relatively slow movements of its members and the suitable tangential angularity of the thrust. Moreover the use of compound planet wheels as heretofore involved in some constructions of gearing of this type is avoided. Also for a given permissible load per unit width of tooth, the space allowance for tooth width is reduced so that the axial space required to accommodate the gearing is correspondingly diminished.

The accompanying drawings show how the said invention can be conveniently carried into practice. In these drawings:—

Figure 3 is a view similar to Figure 1 illustrating a modified constructional form of the improved gearing, and Figure 4 shows a transverse section of the same on the line, $z$, $z$, Figure 3.

Figure 5 is an axial sectional view of a further modified form of the gearing with free running parts mounted on antifriction bearings.

Figure 1:
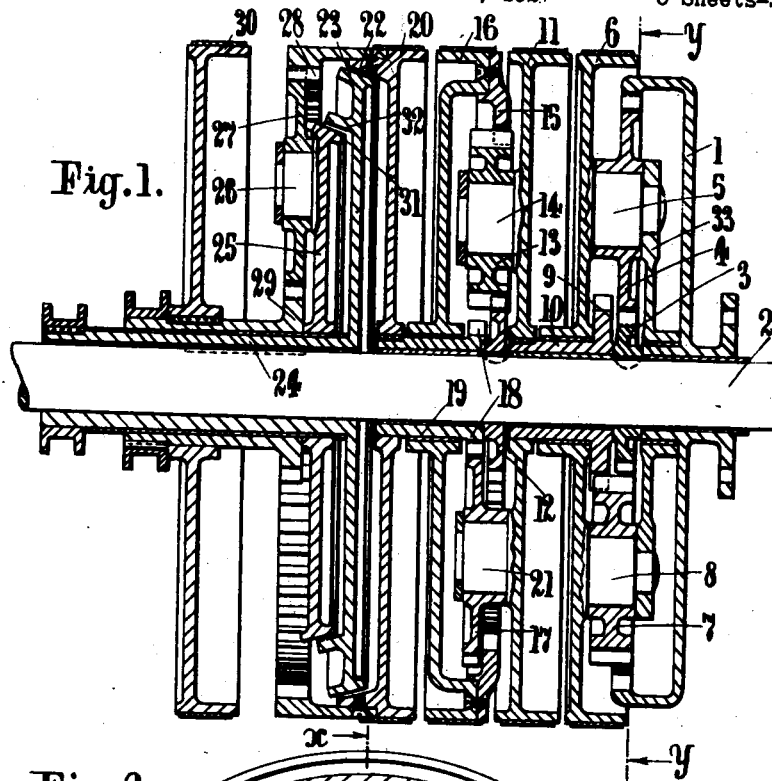
Figure 1 is an axial sectional view on the line $x$, $x$ Figure 2, of variable velocity ratio gearing constructed according to this invention.
Figure 2:
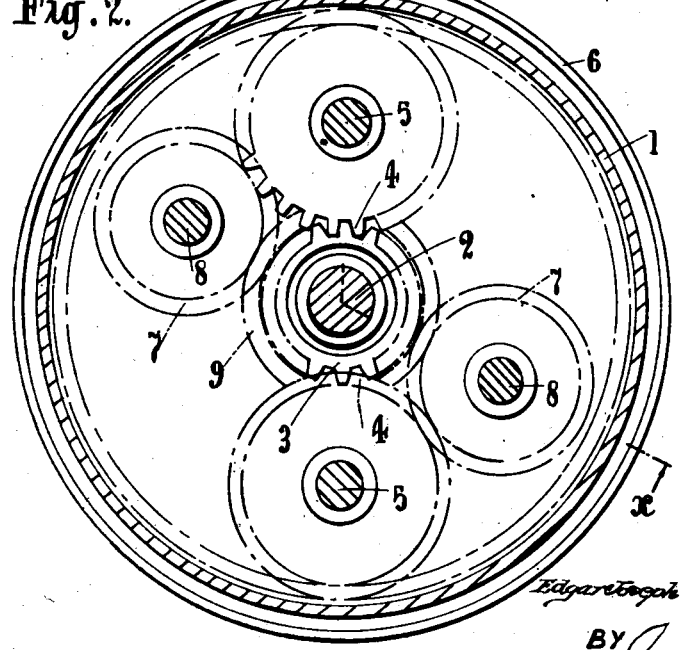
Figure 2 shows a transverse section thereof on the line $y$, $y$, Figure 1.

As shown in Figures 1 and 2, an internally toothed gear wheel 1 which is the driven member of the gearing is mounted to rotate on the driving shaft 2 adjacent to a driving wheel 3 keyed on the shaft, and these wheels 1, 3 are in gear through a pinion 4 mounted on a trunnion 5 carried on the web of a brake drum 6. By considering Figure 2 it will be seen that when the driving shaft is in rotation, by holding the brake drum 6 against rotation, the internally toothed gear wheel 1 is caused to rotate in the opposite direction to the driving shaft and at a slower velocity, the driving effort being transmitted entirely through the pinion 4. The above mentioned pinion 4 which can be called the first planet wheel is in gear with a second planet wheel 7 also carried on a trunnion 8 on the same brake drum 6. The second planet wheel is in gear with a sun wheel 9 keyed to or integral with a sleeve 10 which is free to rotate about the driving shaft 2. The hub of the reverse drive brake drum 6 is mounted to rotate on the sleeve 10 which has a brake drum 11 keyed to it herein referred to as the first speed brake drum. By releasing the reversing brake drum 6 and holding the first speed drum 11 against rotation, the driving wheel 3, through the first planet wheel 4 drives the second planet wheel 7 so that it travels around the above mentioned or first sun wheel 9 held fast by the first speed drum 11, and then the first planet wheel 4 causes the first internally toothed wheel 1 or driven member of the train to rotate in the same direction as the driving shaft 2 but at a slower speed. The first sun wheel 9 and the first driving wheel 3 can be of different diameters, as shown, and the second planet wheel 7 can be made sufficiently wide to gear with the first sun wheel 9 and the first planet wheel 4. The driving wheel 3 and sun wheel 9 can thus be brought close together thereby economizing the space occupied by the gear in the axial direction along the shaft 2. More than one pair of planet wheels 4, 7 can be provided in each group, and in Figure 2, two pairs of such planet wheels are shown.

By the following arrangements, the first sun wheel 9 can be given a rotational movement in the same direction as the driving wheel so as to increase the velocity ratio between the driving wheel 3 and the internally toothed wheel 1 serving as the driven member. For this purpose a second driving wheel 12 is keyed on the driving shaft 2 in gear with a third planet wheel 13 carried on a trunnion 14 on the web of the first speed brake drum 11. The third planet wheel 13 is in gear with an internally toothed wheel 15 carried by a brake drum 16 herein referred to as the second speed brake drum, so that when this second speed brake drum is held fast, the third planet wheel 13 is caused by the second driving wheel 12 to travel round the internally toothed wheel 15 in the same direction as that in which the shaft 2 is rotating. The first speed brake drum 11 and consequently the first sun wheel 9 are caused to rotate in the same direction as the driving shaft; and the gear wheels 12, 13, 15, for thus rotating the first speed brake drum 11, can be proportioned so as to give a relatively slow forward speed to the first sun wheel 9. The driven wheel 1 is then rotated at a higher velocity ratio than when the first sun wheel 9 is held fast.

The third planet wheel 13 is made with broad teeth so that it can gear with a fourth planet wheel 17 which is also in gear with a second sun wheel 18 mounted on or integral with a sleeve 19 passing through the hub of the second speed brake drum 16 which is mounted to rotate freely thereon, and this sleeve 19 is keyed to a third speed brake drum 20. The fourth planet wheel 17 is carried like the third planet wheel by a trunnion 21 on the web of the first speed brake drum 11. Then by stopping rotation of the third speed drum 20, the second driving wheel 12 drives the fourth planet wheel 17 through the third planet wheel 13 and thus causes the fourth planet wheel 17 to travel round the stationary sun wheel 18 in the same direction as that in which the shaft 2 is rotating. The gear wheels 12, 13, 17, 18 can be so proportioned that the first speed drum 11 will be rotated at a higher speed when the third speed drum 20 is held against rotation than when the second speed drum 16 is so held, and thus when the third speed drum is held the first sun wheel is rotated at a different speed from that at which it was caused to rotate by holding the second speed drum against rotation, and thereby the speed of the driven member relatively to the driving shaft is increased. In like manner the speed of the third speed drum can be increased and so on indefinitely, the increase of the velocity ratio as each addition is made to the operative train being as small as desired by employing sun and planet wheels, or driving, planet and internally toothed gears appropriately proportioned.

In the arrangement shown in Figure 1, the brake drum 20 of the third speed can be provided with a clutch surface 22 co-operating with a clutch member 23 carried by a sleeve 24 keyed to the driving shaft. When the sleeve 24 is moved axially on the shaft 2 to bring the clutch member 23 into engagement with the clutch surface 22 and prevent rotation of the brake drum 20 relatively to the shaft 2, the third and fourth planet wheels 13, 17 are held against rotation about their own axes between the second sun wheel 18 and the second driving wheel 12, the first speed brake drum 11 and the first sun wheel 9 being thus caused to revolve with the driven shaft. The first and second planet wheels 4, 7 are then held against rotation about their own axes between the first sun wheel 9 and the first driving wheel 3, and the gearing being thus locked a driving effort is communicated to the driven member 1 by the locked gear members, the first and second driving wheels 3, 12 and the key of the sleeve 24 acting simultaneously as driving dogs, providing a fourth forward speed or direct drive.

In addition to the parts of the variable velocity ratio gearing hereinabove mentioned, the sleeve 24 of the sliding member of the clutch may have mounted thereon a carrier 25 for the trunnion 26 of a fifth planet wheel 27 in gear with an internally toothed gear wheel 28 on the third speed brake drum 20 and also in gear with a third sun wheel 29 keyed to a brake drum 30, by means of which this sun wheel 29 can be held against rotation. When the clutch 22, 23 is released so that the third speed brake drum 20 can rotate relatively to the shaft 2, the carrier for the fifth planet wheel 27 can be locked to the clutch sleeve 24 by means hereinafter described and is thereby rotated at the same speed as the driving shaft. If the fifth speed brake drum 30 is now held against rotation, a forward rotational movement relatively to the shaft 2 will be imparted to the third speed drum 20 increasing in turn the speed of the second sun wheel 18 and the first sun wheel 9, whereby the driven member 1 is rotated at a greater speed than the driving shaft 2. In order to lock the carrier 25 to the clutch sleeve 24, these parts are provided with clutch parts 31, 32 which can be brought into engagement by an axial movement of the sleeve 24 of the third sun wheel 29. The sleeve carrying the sun wheel 29 and fifth speed brake drum 30 may be held against axial movement or means may be provided so that it can be moved to advance the clutch surface 31 into or retract it from engagement with the clutch surface 32. If necessary, the internally toothed gear wheel 28 provided on the third speed drum 20 to engage the fifth planet wheel 27 has teeth which are sufficiently broad to allow the required relative axial movement between the fifth planet wheel 27 and the third speed drum 20 permitting the clutch parts 31, 32 to be moved into and out of engagement.

The trunnions carrying the planet wheels may be supported at their outer ends, for example, as shown in Figure 1, the outer ends of the trunnions 5, and 8, are supported by a disc 33.

In the arrangements shown in Figures 3 and 4, a reverse brake drum and first speed brake drum are provided with trains of gearing similar to that shown in Figure 1, that is to say, an internally toothed wheel 1 is rotatably mounted on a driving shaft 2 and is rotated by a driving wheel 3 through a planet wheel 4 on a trunnion 5 carried by the reverse brake drum 6 when this brake drum is held against rotation, and a slow forward speed is transmitted to the driven member 1 when the first speed brake drum 11 keyed on a sleeve 10 is held stationary, a second planet wheel 7 on a trunnion 8 carried by the web of the drum 6 then travelling on a sun wheel 9 and controlling the movement of the said brake drum 6 which also carries the trunnion 5 of the planet wheel 4 by which movement is transmitted to the driven member from the driving wheel 3. A second forward speed is provided by a third planet wheel 13 rotatable on a trunnion 14 on the web of the first speed brake drum 11 and in engagement with a second driving wheel 12 keyed to the shaft 2 and also in engagement with an internally toothed wheel 15 provided on the second speed brake drum 16 to impart a rotary movement to the first speed drum 11 and sun wheel 9. In this arrangement however the fourth planet wheel 17 instead of being in gear with the third planet wheel 13 is in gear with a third internally toothed wheel 34 carried on the first forward speed brake drum 11, the third planet wheel 13 projecting through slots 35 in the rim 36 of this third internally toothed wheel so as to engage with the second internally toothed wheel 15 on the second speed brake drum 16. Moreover, the trunnion carrying the fourth planet wheel 17 is carried on the web of the said second speed drum instead of being carried on the web of the first speed drum 11. As in the arrangement shown in Figure 1, the fourth planet wheel is in gear with a sun wheel 18 carried by a sleeve 19 on which the third forward speed brake drum 20 is mounted.

In this arrangement, as shown in Figure 3, an alternative arrangement of direct drive clutch surfaces 37, 38 is provided, the clutch surface 38 being brought into engagement with the clutch surface 37 mounted on the drum 20 to lock the gear and provide a fourth speed or direct drive when the sleeve 39 is caused to slide along the shaft 2 away from the third speed brake drum to which the clutch surface 37 is attached. The clutch surface 37 is formed on a part of a rim 40 on which an internally toothed wheel 41 for the fifth speed is also formed. A fifth planet wheel 42 is carried on a web 43 having a clutch surface 44 to engage a clutch surface 45 carried on the same member as the clutch surface 38, the web 43 being movable axially with respect to the shaft 2 for which purpose it is carried on a sleeve 46 freely rotatable on the sleeve 39 and having mounted thereon the hub of a fifth speed brake drum 47 which is integral with a sun wheel 48 with which the fifth planet wheel 42 engages. Then, in like manner to the arrangement shown in Figure 1, by holding the fifth speed drum 47 stationary, when the clutch surfaces 44, 45 are in engagement, an additive movement will be communicated to the third speed drum 20 so as to effect rotation of the driven member 1 as hereinabove explained at a speed in excess of that of the driving shaft 2.

In a modified constructional form of the gear shown in Figures 1 and 2, the fourth planet wheel 17 is arranged in gear with the internally toothed wheel 15 on the second speed brake drum 16. The third planet wheel 13 is then in gear with the second driving wheel 12 and fourth planet wheel 17 only. In this case the said fourth planet wheel 17 can be made sufficiently wide to engage the second sun wheel 18 as well as the third planet wheel 13, the second sun wheel 18 can be made of a larger diameter than the second driving wheel 12, and the third planet wheel can be made of a larger diameter than is possible when it is necessary to insert it between the second driving wheel 12 and the internally toothed gear 15.

Figure 5 shows a practical embodiment of the invention in which the improved gearing is shown in operative relation with parts of a transmission mechanism of an automobile vehicle. The gearing shown in Figure 5 is substantially identical with that shown in Figure 1 as far as concerns the means for obtaining a reverse drive, three forward speeds at different velocity ratios and a direct drive, and the corresponding parts in the two figures are indicated by like reference numerals. The gearing for a fifth speed is however omitted and the clutch member 23 of the direct drive is carried by a sleeve 50 keyed to the shaft 2 and movable axially by a spring 51 to hold the clutch parts 22, 23 in engagement, suitable means being provided to hold these parts separated when it is desired to leave the drum 20 free to rotate independently.

A convenient system of antifriction bearings is provided comprising ball races 52 to support the driven member 1, and roller bearings 53 supporting the end of the driving shaft 2 within a hub portion of the driven member. The first speed drum sleeve 10 is carried on antifriction bearings 54 whilst a hub portion on the web of the reverse drum 6 is carried on roller bearings 55, and the disc 33 is carried on a ball bearing 56. The sleeve 19 of the drum 20 is carried on antifriction bearings 57 and the hub of the second speed drum 16 is carried on the outside of this sleeve by an interposed antifriction bearing 58. To take up the end thrust exerted between the sleeves 19 and 50 by the spring 51, a thrust bearing 59 is provided and it should be noted that the construction and arrangement of the gear is such that there is no other point at which any end thrust exists. The planet pinions 4, 7, 13 and 17 are also shown mounted on antifriction bearings on their respective trunnions.

I claim:

1. Variable velocity ratio gearing comprising a driving shaft, a brake drum, two planet wheels carried on trunnions on the web of the brake drum and in gear one with the other, a driving wheel and an internally toothed wheel each in gear with one of the said planet wheels, a sun wheel in gear with the other planet wheel, a second brake drum having the sun wheel keyed thereto, a third planet wheel carried by a trunnion on the second brake drum, and a second driving wheel and an internally toothed wheel on a third brake drum each in gear with the planet wheel last mentioned.

2. Variable velocity ratio gearing comprising a driving shaft, a brake drum, two planet wheels carried on trunnions on the web of the brake drum and in gear one with the other, a driving wheel and an internally toothed wheel each in gear with one of the said planet wheels, a sun wheel in gear with the other planet wheel, a second brake drum having the sun wheel keyed thereto, a third planet wheel carried by a trunnion on the second brake drum, a second driving wheel and an internally toothed wheel on a third brake drum each in gear with the third planet wheel, a fourth planet wheel between the second and third brake drums and operative to impart motion to the second brake drum, a second sun wheel in gear with the fourth planet wheel and a fourth brake drum keyed to the said second sun wheel.

3. Variable velocity ratio gearing comprising a driving shaft, a driving wheel and an internally toothed driven wheel on the said shaft, a brake drum, two planet wheels carried on trunnions on the web of the brake drum and in gear one with the other, one of the said planet wheels being also in gear with the said driving and driven wheels, a sun wheel in gear with the other planet wheel, and gearing for transmitting to the said sun wheel a variable rotary motion relatively to the driving shaft.

4. Variable velocity ratio gearing comprising a driving shaft, a brake drum, two planet wheels carried on trunnions on the web of the brake drum and in gear one with the other, a driving wheel keyed on the driving shaft and an internally toothed wheel free to rotate coaxially with the driving wheel, each in gear with one of the said planet wheels, a sun wheel in gear with the other planet wheel, a second driving wheel keyed on the driving shaft, and gearing transmitting a positive motion from the said second driving wheel to the sun wheel.

5. Variable velocity ratio gearing comprising a driving shaft, a plurality of driving wheels keyed on the said shaft, separate groups of gearing respectively associated with each driving wheel and arranged in succession in a train, each group comprising a sun wheel, an internally toothed wheel, a planet wheel in gear with the driving wheel and the internally toothed wheel, a planet wheel in gear with the first mentioned planet wheel and the sun wheel, and brake drums controlling the planetary movements of the said planet wheels.

6. Variable velocity ratio gearing comprising a driving shaft (2), a plurality of driving wheels keyed on the said shaft, separate groups of gearing respectively associated with each driving wheel and arranged in succession in a train, each group comprising a sun wheel (18), an internally toothed wheel (15), a planet wheel (13) in gear with the driving wheel (12) and the internally toothed wheel (15), a planet wheel (17) in gear with the first mentioned planet wheel (13) and the said sun wheel (18), and brake drums (16, 20) controlling the planetary movements of the said planet wheels, and a clutch (22, 23) for locking one of the brake drums (20) to the driving shaft.

7. Variable velocity ratio gearing comprising a driving shaft, a plurality of driving wheels keyed on the said shaft, separate groups of gearing respectively associated with each driving wheel and arranged in succession in a train, each group comprising a sun wheel, an internally toothed wheel, a planet wheel in gear with the driving wheel and the internally toothed wheel, a planet wheel in gear with the first mentioned planet wheel and the said sun wheel and brake drums controlling the planetary movements of the said planet wheels, the planetary movement of the planet wheels of one group being communicated to the sun wheel of the next adjacent group.

8. Variable velocity ratio gearing comprising a driving shaft, a brake drum, two planet wheels carried on trunnions on the web of the brake drum and in gear one with the other, a driving wheel keyed on the driving shaft and an internally toothed wheel free to rotate coaxially with the driving wheel each in gear with one of the said planet wheels, a sun wheel in gear with the other planet wheel, the driving wheel and the sun wheel lying together within the planes of the end faces of one of the said planet wheels, a second driving wheel keyed on the driving shaft, and gearing transmitting variable motion from the said second driving wheel to the sun wheel.

EDGAR JOSEPH de NORMANVILLE.